(12) United States Patent
Reynolds (10) Patent No.: US 8,614,523 B2
(45) Date of Patent: Dec. 24, 2013

(54) TURBINE ASSEMBLY

(76) Inventor: Richard Arthur Henry Reynolds, Cooran (AU)

(*) Notice: Subject to any disclaimer, the term of this patent is extended or adjusted under 35 U.S.C. 154(b) by 112 days.

(21) Appl. No.: 12/810,866

(22) PCT Filed: Jan. 6, 2009

(86) PCT No.: PCT/AU2009/000010
§ 371 (c)(1),
(2), (4) Date: Jun. 28, 2010

(87) PCT Pub. No.: WO2009/086593
PCT Pub. Date: Jul. 16, 2009

(65) Prior Publication Data
US 2010/0283251 A1   Nov. 11, 2010

(30) Foreign Application Priority Data
Jan. 8, 2008  (AU) .............................. 2008900080

(51) Int. Cl.
*F03B 13/00* (2006.01)
(52) U.S. Cl.
USPC .............................................. 290/54; 290/55
(58) Field of Classification Search
USPC .................... 290/54, 43, 52, 42, 53
See application file for complete search history.

(56) References Cited

U.S. PATENT DOCUMENTS

| | | | | |
|---|---|---|---|---|
| 2,790,596 A * | 4/1957 | Stirling | ............................ | 417/362 |
| 3,995,170 A * | 11/1976 | Graybill | ............................ | 290/55 |
| 4,417,852 A * | 11/1983 | Costabile et al. | ............... | 416/2 |
| 4,681,512 A * | 7/1987 | Barnard | ..................... | 416/132 B |
| 4,684,817 A * | 8/1987 | Goldwater | ....................... | 290/55 |
| 5,324,988 A * | 6/1994 | Newman | .......................... | 290/54 |
| 5,823,749 A * | 10/1998 | Green | ......................... | 416/132 B |
| 6,147,415 A * | 11/2000 | Fukada | ........................... | 290/55 |
| 6,309,179 B1 * | 10/2001 | Holden | ......................... | 415/202 |
| 6,518,680 B2 * | 2/2003 | McDavid, Jr. | ................... | 290/54 |
| 6,734,576 B2 * | 5/2004 | Pacheco | ........................... | 290/55 |
| 6,921,986 B2 * | 7/2005 | Bayer | .............................. | 290/55 |
| 7,397,144 B1 * | 7/2008 | Brostmeyer et al. | ............ | 290/53 |
| 7,633,177 B2 * | 12/2009 | Platt | ................................ | 290/54 |
| 7,785,065 B2 * | 8/2010 | Clemens | ........................ | 415/5 |
| 2003/0001393 A1 * | 1/2003 | Staikos et al. | ................ | 290/55 |
| 2006/0152011 A1 * | 7/2006 | Fraenkel | ......................... | 290/54 |
| 2008/0007069 A1 * | 1/2008 | Diederich | ....................... | 290/55 |
| 2008/0231057 A1 * | 9/2008 | Zeuner | ............................ | 290/54 |
| 2009/0146430 A1 * | 6/2009 | Sear | ................................ | 290/54 |
| 2009/0322095 A1 * | 12/2009 | Mazur | ............................. | 290/55 |
| 2010/0148509 A1 * | 6/2010 | Ortiz | ............................... | 290/53 |
| 2012/0038162 A1 * | 2/2012 | Smith et al. | .................... | 290/52 |

FOREIGN PATENT DOCUMENTS

| | | | |
|---|---|---|---|
| AU | 2005203573 A1 | 2/2006 | |
| DE | 10310227 A1 | 9/2004 | |
| WO | 2004/015266 A1 | 2/2004 | |
| WO | 2007/100639 A2 | 9/2007 | |
| WO | 2007/102727 A1 | 9/2007 | |

* cited by examiner

*Primary Examiner* — Tulsidas C Patel
*Assistant Examiner* — Viet Nguyen
(74) *Attorney, Agent, or Firm* — David A. Guerra (57) ABSTRACT

A turbine assembly comprising a blade assembly having a plurality of curved blades with an inner end of each of the curved blades terminating at a cavity. The cavity has an open side with a generator located within the cavity and coupled to the blade assembly. The turbine assembly is suitable for underwater use. Multiple turbine assemblies may be connected to form a power generation station.

20 Claims, 8 Drawing Sheets

FIG. 9

TURBINE ASSEMBLY

CROSS-REFERENCE TO RELATED APPLICATIONS

This application is an U.S. national phase application under 35 U.S.C. §371 based upon co-pending International Application No. PCT/AU2009/000010 filed on Jan. 6, 2009. Additionally, this U.S. national phase application claims the benefit of priority of co-pending International Application No. PCT/AU2009/000010 filed on Jan. 6, 2009 and Australia Application No. 2008900080 filed on Jan. 8, 2008. The entire disclosures of the prior applications are incorporated herein by reference. The international application was published on Jul. 16, 2009 under Publication No. WO 2009/086593 A1.

This invention relates to a turbine assembly which may be used for the purpose of generation of electricity. The turbine assembly may be activated by fluid currents, such as wind or water. More particularly, the turbine assembly may be used in hydro-electric power generation systems utilizing kinetic water energy.

BACKGROUND TO THE INVENTION

Turbines for power generation are known in the art. U.S. Pat. No. 5,009,568 refers to a wave activated generating apparatus comprising a water turbine mounted for rotation within a housing on an upright output shaft. The housing includes a back panel and opposing sides and upper and lower surfaces that form a water nozzle which is adapted to face oncoming waves and to direct them into the housing. A wave splitter directs a portion of each oncoming wave directly against the facing surfaces of blades of the water turbine while another wave portion is directed against the back panel of the housing and redirected against the facing surfaces of the opposite water turbine blades.

The turbine may be mounted on a shaft which is operably connected to a weighted fly wheel of a power generator.

U.S. Pat. No. 5,664,418 refers to a vertical axis wind turbine supported on a frame held in place by an encircling series of crescent shaped tubular deflector vanes. The vanes widen towards the core or hub of the turbine concentrating the wind. The wind is trapped momentarily on entering a hollow interior of the turbines. A shaft supporting the turbines is coupled to a drive shaft which is then associated with a differential gear box. There are also provided a pair of split axle drive shafts coupled to the differential gear box which carry power through brakes and wheel plate couplers to electric generators.

U.S. Pat. No. 5,451,138 describes an elongate turbine with airfoil-shaped blades mounted transversely to the direction of flow of fluid. The turbine rotates in the same direction irrespective of the direction of fluid flow. Related U.S. Pat. No. 5,451,137 describes a similar turbine with the blades arranged in a helical configuration. The helical design has been used for power generation from tides and currents and has been referred to as the Gorlov Helical Turbine after the inventor, Alexander Gorlov.

In regard to the prior art it has been found that the turbine structures are unduly complex making the turbines difficult and costly to manufacture. The connection between the turbine and the generator has also been found to be complicated in structure especially in regard to U.S. Pat. Nos. 5,009,568 and 5,664,418.

OBJECTS OF THE INVENTION

It is an object of the invention to provide a turbine assembly which is simple in structure and efficient in operation.

It is a further object of the invention to provide a blade assembly for a turbine assembly.

It is a still further object of the invention to provide the public with a useful alternative to existing turbines and turbine blade assemblies. Other objects will be evident from the following description.

DISCLOSURE OF THE INVENTION

In one form although it need not be the only or indeed the broadest form, the invention resides in a turbine assembly comprising a blade assembly and a generator. The blade assembly has a plurality of curved blades with an inner end of each of the curved blades terminating at an inner cavity or void. The inner cavity or void is open on one side. The generator is located within the inner cavity or void and is coupled or attached to the blade assembly. Each of the curved blades has a dynamic structure that flexes to expand under fluid pressure and at least partially collapses under reverse pressure.

The cavity is suitably sealed and provides an air pocket for the generator. The cavity may be filled with an insulator fluid such as oil or air.

The blade assembly suitably has a central hub which may engage in male-female relationship or spigot and socket relationship with a mating shaft of the generator. Preferably the central hub of the blade assembly has a hollow interior and thus forms a socket for engagement with a shaft of the generator which is preferably solid and forms a mating spigot for the socket. However, it is also possible that the generator shaft has a socket for engaging with a spigot of the central hub of the blade assembly.

The blade assembly may therefore be releasably attached to the generator shaft and thus there may be provided suitable fasteners interconnecting the blade assembly hub and the generator shaft.

In any of the above arrangements it will be appreciated that the blade assembly will rotate a central shaft of the generator and thus generate an electric current in conventional manner.

Each of the blades of the blade assembly is suitably arcuate forming a concave surface facing the impact of fluid. The opposite surface may be convex or planar. Preferably each of the blades has a uniform width or transverse dimension along their length but this is not essential. Each blade may have a dynamic structure that flexes to expand under fluid pressure and collapses under reverse pressure.

Each blade may suitably be pitched at an angle to the axis of rotation. A suitable pitch is 45 degrees. The pitch may vary from one end of the blade to the other.

The generator may be used to produce direct current or alternating current as is known in the art. The generator may also be electric, hydraulic or pneumatic.

BRIEF DETAILS OF THE DRAWINGS

Reference may be made to a preferred embodiment of the invention as shown in the attached drawings wherein.

DETAILED DESCRIPTION OF THE DRAWINGS

Figure 1:
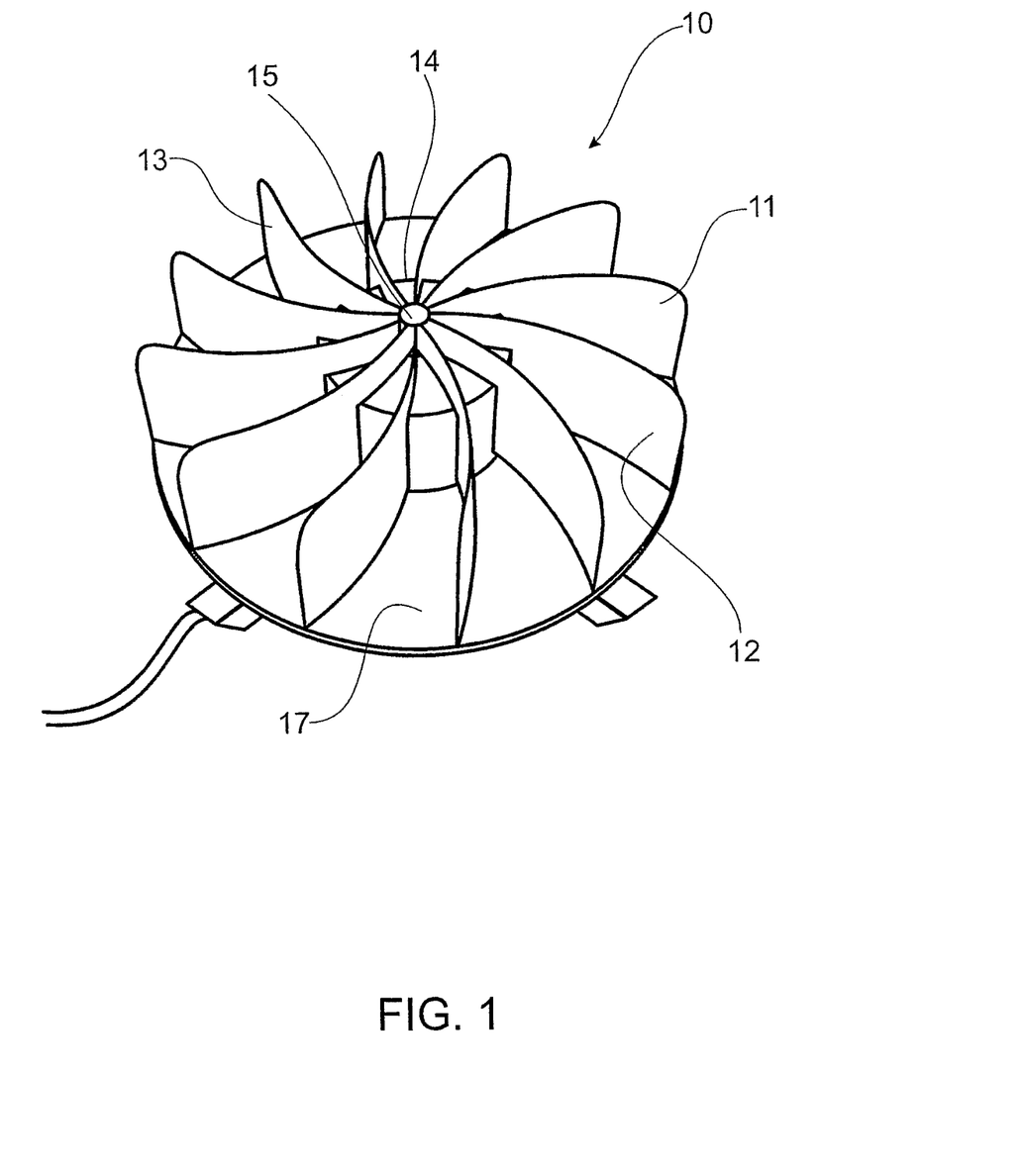
FIG. 1 is a perspective view of the turbine of the invention.

The turbine assembly 10 shown in FIG. 1 has a blade assembly 11 comprising a plurality of blades or vanes. Each blade of the blade assembly 11 has an arcuate shape, as shown most clearly in FIG. 4, and terminates at inner cavity 14. Each blade has a concave facing surface 12 that catches the current and a convex opposite surface 13. The blade assembly 11 sits on a flange 17 that terminates at the inner cavity 14 and extends to an outer end of the blades.

The blade assembly 11 includes a central shaft 15 that rotates with the blade assembly 11. The shaft 15 couples to a rotating central shaft 16 of a generator 20 that is housed within the inner cavity 14, as seen most clearly in FIG. 3. As seen in the exploded view of FIG. 2, the generator 20 is fixed to a base 21. This can conveniently be done by a flange 22 held by welds 23. Any other conventional fixing means such as bolts or screws could also be used.

Figure 2:
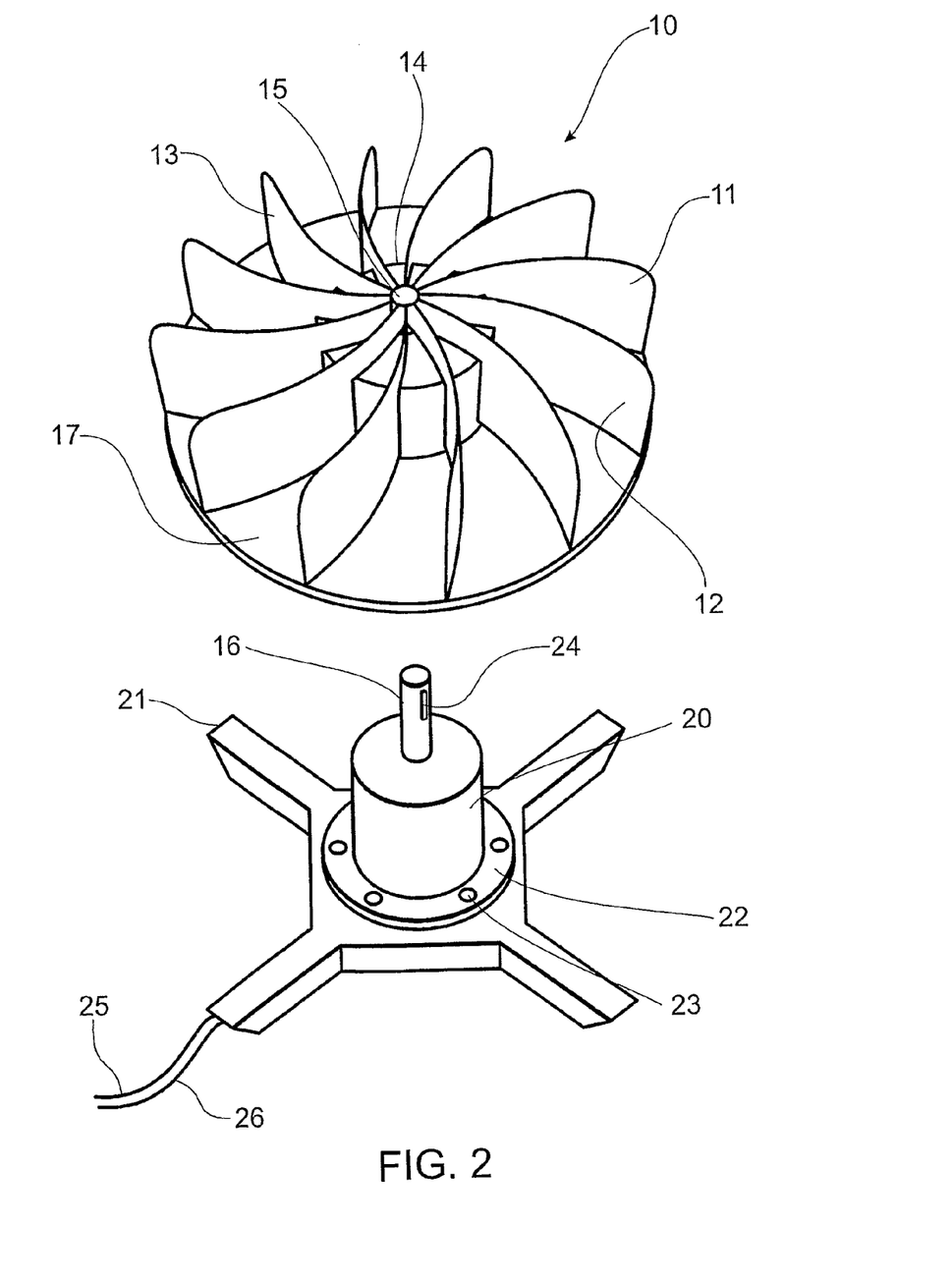
FIG. 2 is an exploded perspective view of the turbine of the invention.

The shaft 15 is conveniently hollow with a key way (not visible) that mates to a key 24 on the shaft 16 of the generator 20. The key 24 and key way ensures that the shaft 16 rotates with the blade assembly 11 to operate the generator 20. The generator 20 is provided with electrical conductors 25 and 26 as shown in FIG. 2 so that an electric current generated by generator 20 may be conducted as desired.

Figure 3:
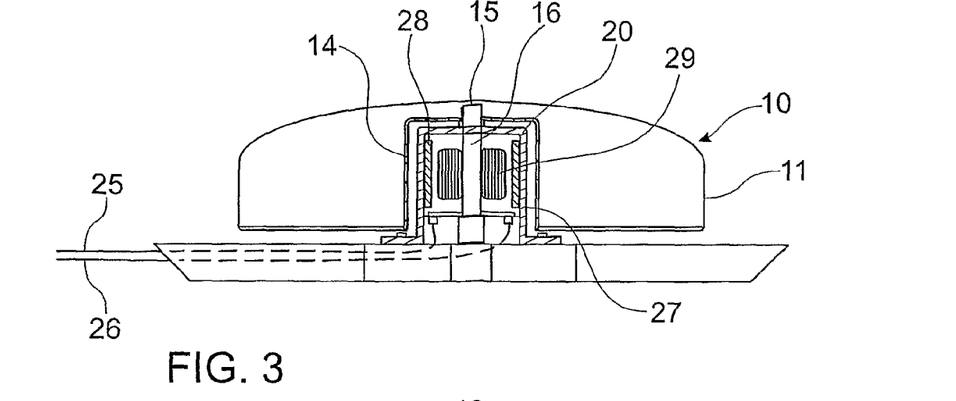
FIG. 3 is a sectional view of the turbine shown in FIG. 1.

Referring to FIG. 3 the detail of the turbine 10 is shown in cross-section. A conventional generator 20 consists of a case 27 that mounts electromagnets 28. A coil 29 on the shaft 16 rotates in the magnetic field formed by the magnets 28 to generate a current that flows through conductors 25, 26. The generator 20 sits in the void formed by the inner cavity 14 of the blade assembly 11. In the case where the turbine 10 is configured for underwater use, the inner cavity 14 is waterproof and may be filled with air, gas or oil so that the generator 20 can operate without needing to provide waterproofing of the generator 20. A positive pressure of fluid (air, gas or oil) can be maintained in the cavity by pumping fluid into the cavity at a slow rate.

As seen clearly in FIG. 3, the cavity 14 is open at the bottom and the blade assembly sits over the generator 20 such that the generator 20 is within the cavity. It will be appreciated that the generator 20 may easily be replaced by simply removing the blade assembly 11, detaching the generator 20 from the base 21 and reassembling with a new generator.

Figure 4:
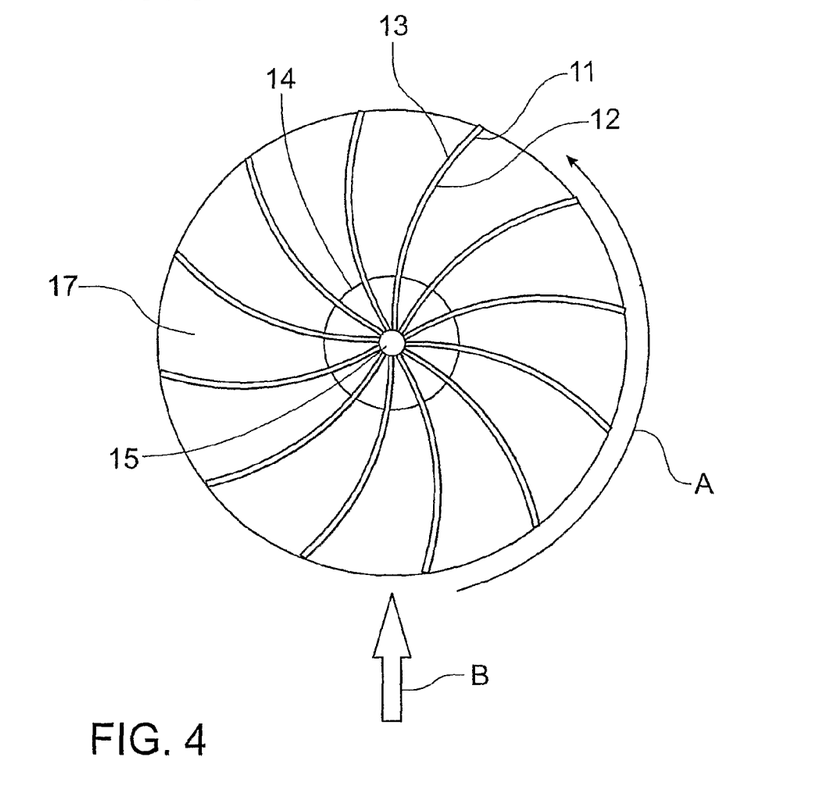
FIG. 4 is a schematic top plan view of the turbine shown in FIG. 1.

In operation the turbine 10 is placed in a fluid flow zone. The fluid flow zone may be a water flow zone such as a river current or an ocean current. The turbine 10 may also be configured for power generation from air flow (wind) but the inventor recognises that river currents and ocean currents are far more reliable than wind. In FIG. 4 the direction of fluid flow is shown by arrow B. The fluid flows against concave surfaces 12 and convex surfaces 13 of each blade 11. There is a pressure differential between the force against the concave surface and the convex surface which causes the blade assembly 11 to rotate in the direction shown by the curved arrow A. Unlike a number of the prior art turbines there is no need to provide a housing to control the flow of fluid over the turbine blades. The turbine 10 is simply placed in a location that has fluid flow and the turbine will rotate. In fact, it will be appreciated that the turbine will rotate in the same direction irrespective of the direction of fluid flow.

Figure 5:
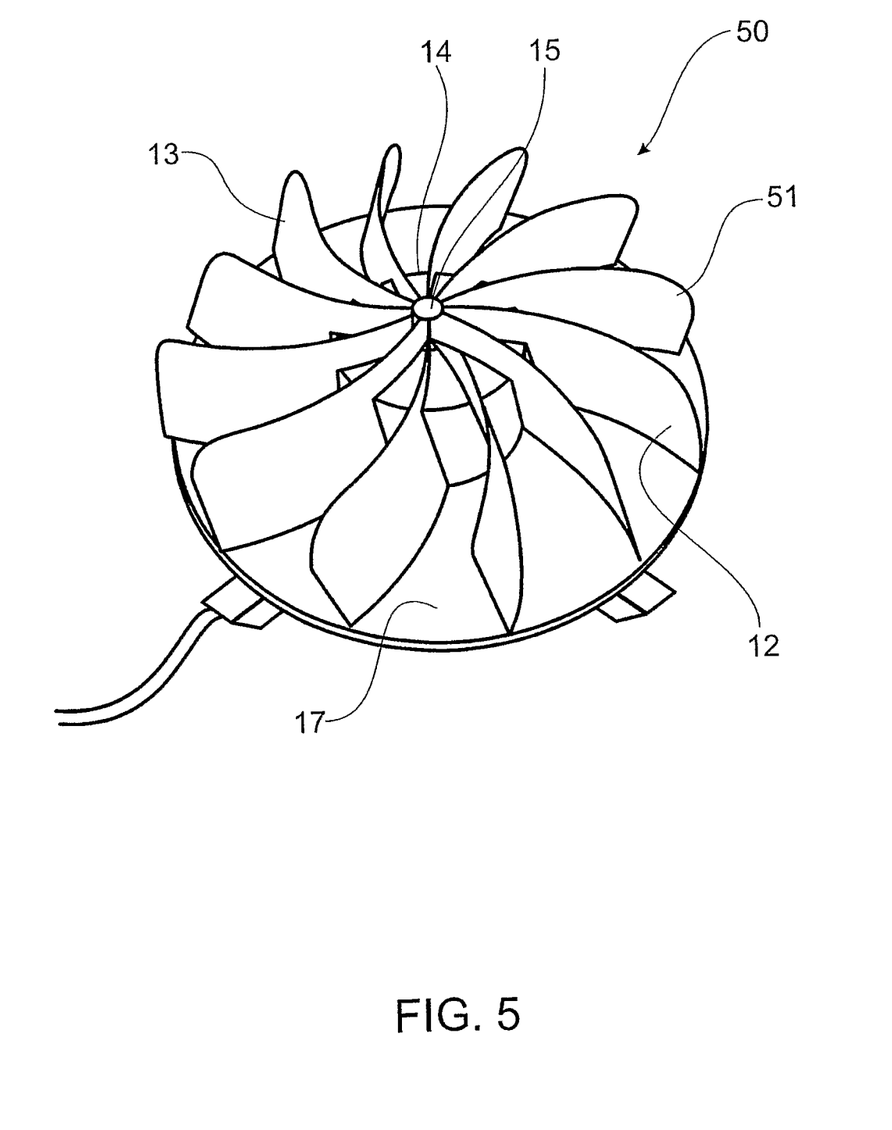
FIG. 5 is a perspective view of a second embodiment of the turbine of the invention.

FIG. 5 shows a second embodiment of a turbine 50 in which the blade assembly 51 has blades with a pitch with respect to the shaft 15. The inventor has found that a pitch of about 45 degrees is suitable, but the invention is not limited to this specific angle. In fact, virtually any pitch assists the fluid mechanics of the turbine 10. The best pitch angle will depend on the specific implementation. Furthermore, the pitch may vary from one end of the blade to another. For instance, the pitch may be small near the shaft 15 and increase as the blade extends away from the shaft 15.

The blades of the embodiment shown in FIG. 5 have a pitch with the lower part of the blade leading the upper part of the blade. This configuration provides a degree of upwards lift, which may be beneficial. The pitch could be flipped so that the upper part of the blade leads the lower part, which generates a degree of downwards lift.

Figure 6:
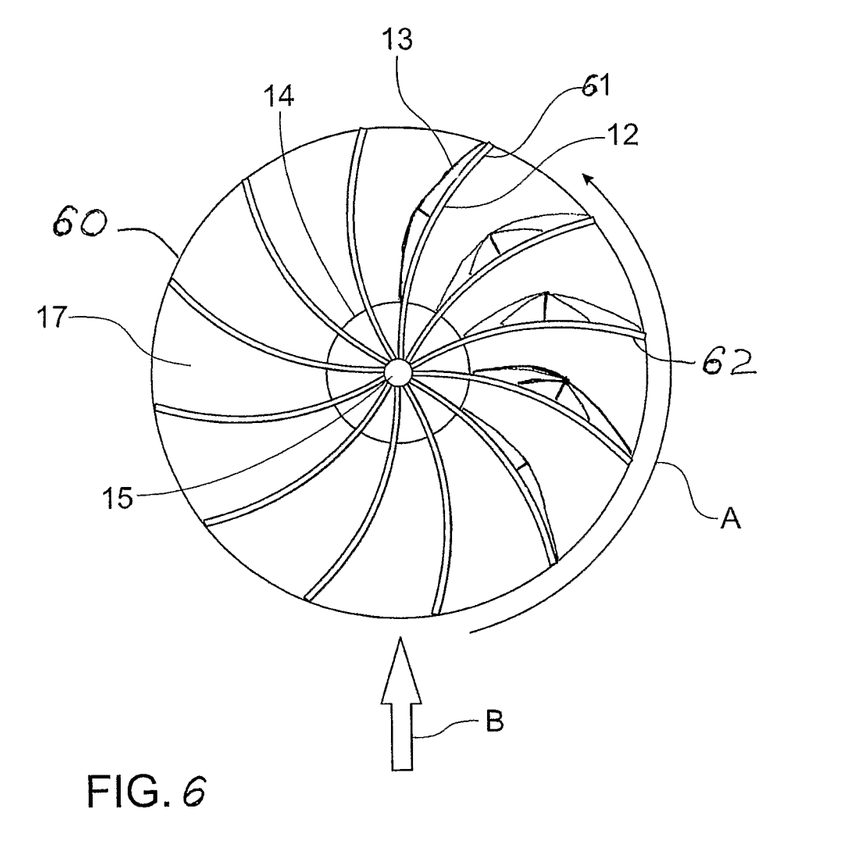
FIG. 6 is a perspective view of a third embodiment of the turbine of the invention.

A further embodiment of a turbine assembly 60 is shown in FIG. 6 in which the blade assembly 61 is formed from dynamic blades that adjust in shape depending on the applied force. This may be achieved by a sectioned blade, such as 62, that expands under an applied force like a sail. The blades having the concave side facing the fluid flow will expand as shown in FIG. 6 to better catch the fluid flow. The other blades will collapse to a non-expanded shape. Other structures could include a resiliently deformable blade fitted against a rigid skeleton on the concave side. The fluid pressure would expand the blade as shown but once rotated it would contract back to the undeformed shape. On the opposite side of the rotation the skeleton would prevent deformation.

Suitable material for the blades of the blade assembly include plastic or metal such as aluminium. The turbine assembly could be produced by extrusion moulding, blow moulding or casting.

Figure 7:
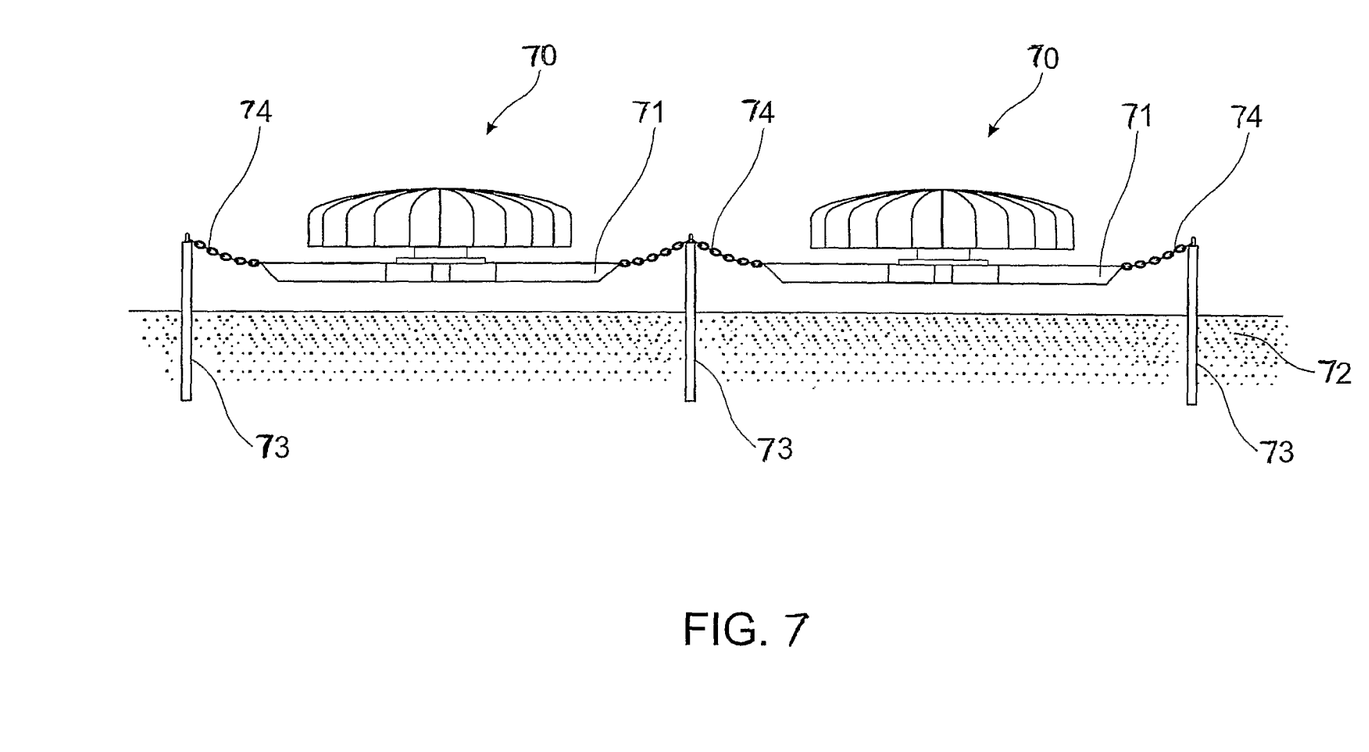
FIG. 7 is a view showing the mounting of the turbine shown in FIG. 1 on a sea or river bed.

FIG. 7 shows how a pair of turbine assemblies 70, which may be of the form of the embodiment of FIG. 1, the embodiment of FIG. 5, or the embodiment of FIG. 6. A number of turbine assemblies together form a power generation station. The base 71 is mounted near a sea bed 72 or river bed wherein each base 71 is supported by piles 73 and chains 74. If desired, base 71 could be hollow or made from buoyant material to facilitate floating of the turbines 70. If the base 71 is hollow it can be filled with water to sink the turbine assembly or filled with air to raise the turbine assembly. Filling the base with water or air is particularly useful for maintenance purposes as it will aid crane recovery or placement of the turbine assembly.

Filling the base 71 with water or air may also be useful for regulating the depth of the turbine assembly to be positioned in maximum current flow. Adding water to the base would cause it to sink to a lower level. Pumping air into the base to displace water would cause the base to float to a higher level. By pumping in air or allowing in water the level of the base can be changed so that the turbine assembly is positioned in a maximum current zone.

The inventor envisages that this process could be automated by positioning flow sensors at various depths and automatically repositioning the turbine assemblies to the depth having the strongest current.

It will be appreciated that the void or cavity 14 may be filled with air and thus there is the possibility of gases or ions which could be formed as a by-product of electricity being generated by generator 20 within cavity 14. Should the cavity 14 require additional air to keep the cavity dry, air can be delivered by a simple air hose which would be connected to an air compressor shore side. The hose supplying air may accompany the conductors 25 and 26 from shore side. The generator 20 would have reasonable resistance to the elements of corrosion (e.g. seawater) within cavity 14.

A preferred turbine assembly according to the invention is for underwater use (for example see FIG. 7), with ocean or river currents. The generator 20 is housed within the inner cavity 14 of the blade assembly, and the cavity 14 is filled with a gas such as air. The positive pressure of the gas resists ingress of water into the cavity 14 when the turbine assembly is underwater.

The invention uses Archimedes principles, particularly in relation to the configuration of the turbine assembly base 71 to which the generator is fixed, to enable the turbine assembly to be located in an operative position on a sea bed or river bed 72, and to be recovered therefrom, for example for maintenance purposes.

The base 71 of a turbine assembly 70 can itself serve as a float or barge, which facilitates transportation of the assembly 70 when it is fully assembled. For example it can be floated or towed out on the base 71 to a location above its intended underwater installation at sea or along a river, the floodable volume of the base 71 being sufficient to float the turbine assembly 70. Instead, the assembly 70 can be loaded onto a vessel with medium heavy lift capabilities, transported to such location, and lifted onto the surface of the water to float above the intended installation.

Figure 8:
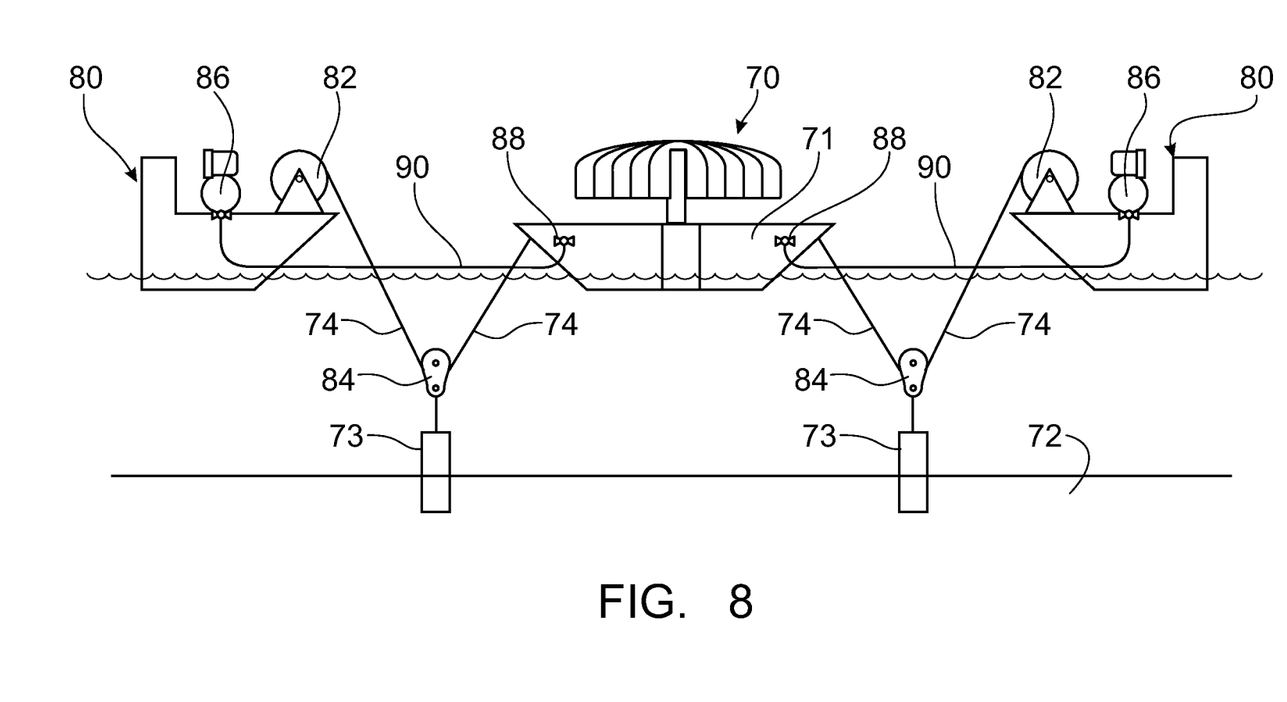
FIG. 8 is a schematic diagram of the turbine assembly of FIG. 7 being installed.
Figure 9:
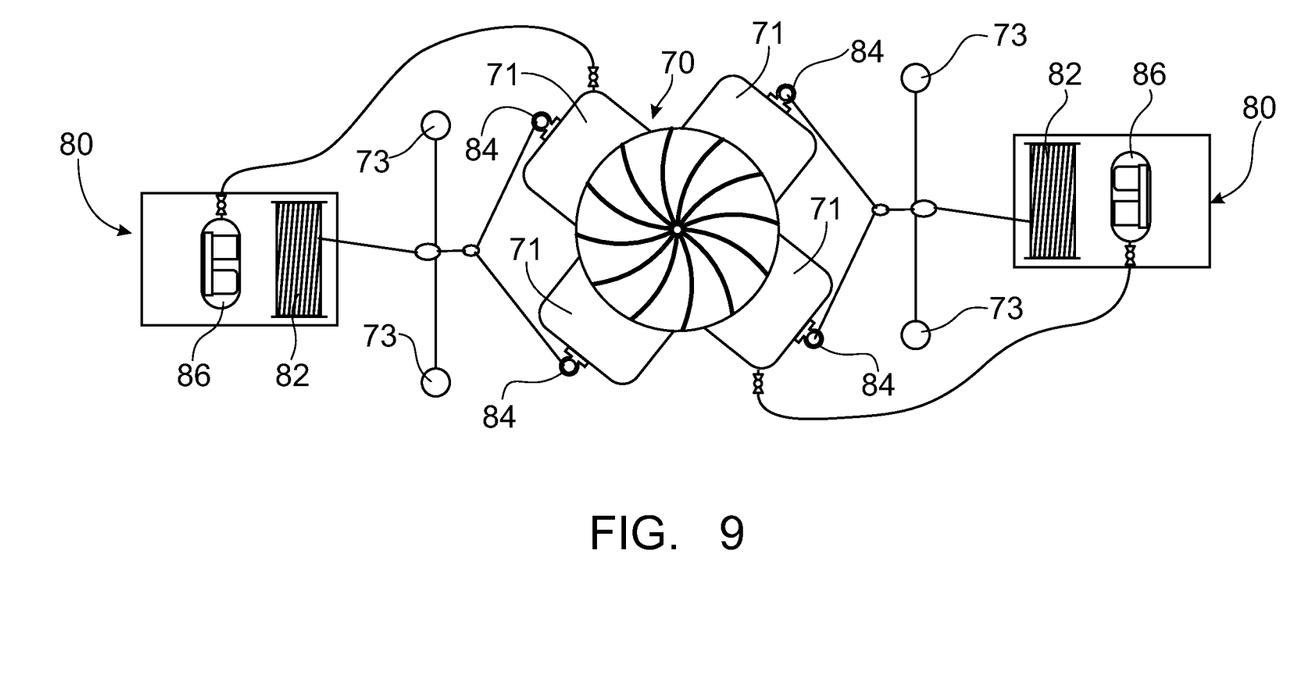
FIG. 9 is a schematic top plan view thereof.

A process for installing the turbine assembly 70 is illustrated schematically in FIGS. 8 and 9 which show two barges 80 provided with winches 82 and sheaves/pulleys 84, and carrying a supply of compressed air 86.

The turbine assembly 70 can be sunk to the sea bed or river bed 72 in a controlled manner by regulating the gas volume in the assembly base 71, and with the assistance of guide wires or chains 74 secured via piles 73, to the sea bed or river bed 72. Similarly, the turbine assembly 70 can be maneuvered underwater, for example onto a mount on the sea bed or river bed, by varying the gas volume in the base 71. As the turbine assembly is lowered to the sea or river bed, the gas in the gas-filled cavity 14 which accommodates the generator reduces in volume. To compensate for the reduction, gas is fed into the cavity 14. This additional positive pressure in the cavity 14 assists, to some extent, to control the depth of the turbine assembly by regulating gas volume.

Increasing the gas volume in the base 71 will enable the turbine assembly 70 to be floated to the surface, and thereby facilitate recovery thereof from the sea bed. It will be appreciated that as the turbine assembly 70 ascends from the sea bed and the water pressure reduces, the resultant expansion of gas in the gas-filled cavity 14 which accommodates the generator, assists in bringing the turbine assembly 70 to the surface.

In order to assist with the maneuver's described above, suitably located ball valves 88 with appropriate sized Chicago Fittings can be connected to the floating base 71. Air hoses 90 with appropriate mating connections can be temporarily attached to these valves 88 to connect the base 71 to the compressed air supply 86, thereby to regulate the air pressure within the assembly base 71.

A separate coupling (not shown), which may be castellated, flanged, cast, or otherwise appropriately constituted and configured, may be provided in the cavity 14 for attaching the shaft 16 to the top of the base 71. Because of the high stress loads likely to be experienced by the coupling, it may advantageously be designed as a replacement part.

As shown in FIGS. 1, 2 and 5, the blades are fixed along their lower, long edges, to the flange 17, and connected via an integral upper connecting portion, to the central shaft 15. In one embodiment, each of the blades traverses the axis of the shaft 15 to create the blade on the opposite side, thereby promoting a unitary design for the blade assembly.

The blades can be made from such materials as will allow dynamic flexing of the blades in the manner described above. The blade tips may be positioned forward of the base of the blades or "luff", the curvature and/or pitch formed thereby firmly maintaining the blades in a substantially upright position capable of capturing the force of the incoming tide. Because of the flexing characteristic of the blades, they offer lower resistance on the return cycle. The particular shape and configuration of the blades enable them to withstand destructive forces associated with underwater currents.

The main structural support for the blades is provided by the flange 17 which is a large disc-like member to which the blades are attached along their lower edges. The long upper edge and shorter outer edge of each blade remain sufficiently free of attachment so that said dynamic blade flexing can occur relatively unhindered in use. Preferably the flange 17 is of unitary design, being cast, molded or layered into its required shape and configuration. In a preferred embodiment, such a unitary design incorporates the cavity 14 which provides the generator housing, and is preferably dome shaped. The lower, long edges of the blades are fixed along the flange 17 and connect, via an integral upper connecting portion on each blade, to the central shaft 15. In one embodiment, the integral connecting portion of each blade extends across the dome and traverses the central axis to create the blade on the opposite side, thereby contributing to a unitary design for the blade assembly.

An optimum number of blades may be selected according to the requisite or desired torque which increases with the number of blades; and the distance between adjacent blades may be selected to minimize the likelihood of objects, marine growth, debris and/or other objects being trapped between the blades.

In summary, the shape of each of the blades and the number and configuration of the blades can be selected to provide such pitch and angle of blades and spacing between the blades, as to maximize efficiency of the turbine assembly 70 and minimize drawbacks of hazards that are regularly encountered by turbine blades underwater. The low profile of the turbine assembly 70 also contributes to its suitability for an underwater environment.

In the turbine assembly of the invention, the cavity 14 which houses components for electricity generation can be kept free of water by maintaining a positive pressure of air or gas within the cavity 14, similar to an upturned glass or cup in a kitchen sink. Thus seals are not required to prevent ingress of water into the cavity 14 in an underwater environment. Nevertheless, in a preferred embodiment of the invention, a splash guard in the form of a soft seal may be used at or above the water line in the cavity, to prevent water from splashing into the cavity. Such a seal may comprise a first ring of firm latex or of softer and pliable Teflon, attached at or about the water line of the cavity; and a second such ring mounted to the shaft or other such position that allows the second ring to overlap the first. The unitary design of the flange 17 preserves the positive pressure within the cavity without the requirement for a system of seals around the cavity 14.

It is considered that the turbine of the invention could be used very beneficially as a subsea hydroelectric power station which will not cause pollution. It is also believed that the tides or currents of an ocean are predictable and this will ensure successful operation of the turbine of the invention.

Persons skilled in the art will realize that various issues arise when connecting power generation units to a grid. The issues have been addressed for various other forms of power generation, such as wind generators. It is envisaged that appropriate transformers and phase matching equipment would be located near the power generation station, but not underwater. For example, in an undersea application the transformers would be located on the coastline.

It will also be understood by persons skilled in the art that various safety devices such as fail-safe brakes, and over-current protection will be incorporated in the turbine assembly for practical application. These devices are well known and are omitted for the sake of brevity.

The generator 20 may also have associated therewith a support so as to resist vibration due to the rotation of the blade assembly 11. The control of vibration is well known to turbine engineers and will be implemented as required for efficient operation of the invention.

Although the description has described the primary embodiment of an electrical generator it should be appreciated that the invention is not limited to this particular implementation. The generator 20 may be any suitable device that converts kinetic energy to other useful energy. Thus the generator could be hydraulic or pneumatic.

In summary it will be appreciated that the blade assembly of the invention is simple in structure and has a direct coupling to a generator located within an open void or cavity of the blade assembly.

The invention claimed is:

1. A turbine assembly comprising:
a substantially horizontal blade assembly having a plurality of curved blades with an inner end of each of the curved blades terminating at a cavity having an open bottom side and a closed top side, each of the curved blades has a dynamic structure that flexes to expand under fluid pressure and collapses under reverse pressure; and
a generator located within the cavity and coupled to the blade assembly;
wherein the closed top side of the blade assembly includes a central hub configured to couple with a shaft of the generator so as to rotate the shaft, the blade assembly being configured to rotate about the generator;
wherein the turbine assembly is substantially submerged.

2. The turbine assembly of claim 1 wherein the cavity is filled with an insulator fluid.

3. The turbine assembly of claim 2 wherein the insulator fluid is selected from the group consisting of air, and gas.

4. The turbine assembly of claim 1 wherein the central hub releasably couples with the shaft of the generator.

5. The turbine assembly of claim 1 wherein the central hub is a socket that fits over and engages the shaft of the generator.

6. The turbine assembly of claim 1 further wherein the central hub is a spigot that fits into and engages a socket in the shaft of the generator.

7. The turbine assembly of claim 5 or 6 further comprising a key on the shaft that engages a keyway on the socket or a key on the socket that engages a keyway on the shaft.

8. The turbine assembly of claim 1 wherein the blade assembly further comprises a flange extending from the cavity to an outer end of the blades.

9. The turbine assembly of claim 1 wherein the curved blades have a concave surface and an opposing convex surface.

10. The turbine assembly of claim 1 wherein each of the curved blades is pitched at an angle to the axis of rotation.

11. The turbine assembly of claim 10 wherein the pitch is 45 degrees.

12. The turbine assembly of claim 10 wherein the pitch varies along the length of the blade.

13. The power generation station of claim 1, wherein the dynamic structure of each of the curved blades is a resiliently deformable blade having a concave side, a convex side, and a rigid skeleton on the concave side, the dynamic structure is configured so that a fluid flow contacting the concave side would expand the resiliently deformable blade, and so that the fluid flow contacting the convex side would contract the resiliently deformable blade.

14. The turbine assembly of claim 1 further comprises a base having a body, and at least one elongated member extending out from the body, wherein the generator is attachable to the body of the base.

15. The turbine assembly of claim 14, wherein the elongated member of the base is four elongated members extending out radially from the body equidistant from each other, at least two of the elongated members each being tethered to a pile, and wherein the elongated members extend out past an end of the curved blades when the generator is located in the cavity.

16. A power generation station comprising two or more turbine assemblies, each turbine assembly comprising:
a substantially horizontal blade assembly having a plurality of curved blades with an inner end of each of the curved blades terminating at a cavity having an open side, and each of the curved blades has a dynamic structure that flexes and expands under fluid pressure and at least partially collapses under reverse pressure;
a hollow base having a body, and at least one elongated member extending out from the body; and
a generator attachable to the body of the hollow base, the generator being located within the cavity and coupled to the blade assembly;
wherein the elongated member extends out past an end of the curved blades when the generator is located in the cavity;
wherein the turbine assemblies are substantially submerged.

17. The power generation station of claim 16 wherein the hollow base is filled with buoyant material.

18. The power generation station of claim 16 wherein the hollow base is fillable with air or water to adjust a depth of the power generation station when underwater.

19. The power generation station of claim 16 further comprising means for securing the base to a sea or river bed when underwater.

20. The turbine assembly of claim 16, wherein the elongated member of the base is four elongated members extending out radially from the body equidistant from each other, wherein the elongated members each being tethered to a pile.

* * * * *